Dec. 13, 1938.     W. CURRY     2,139,883
MAIZE HEADER
Filed Sept. 1, 1937     3 Sheets-Sheet 1

Wiley Curry,
INVENTOR.

BY
ATTORNEYS.

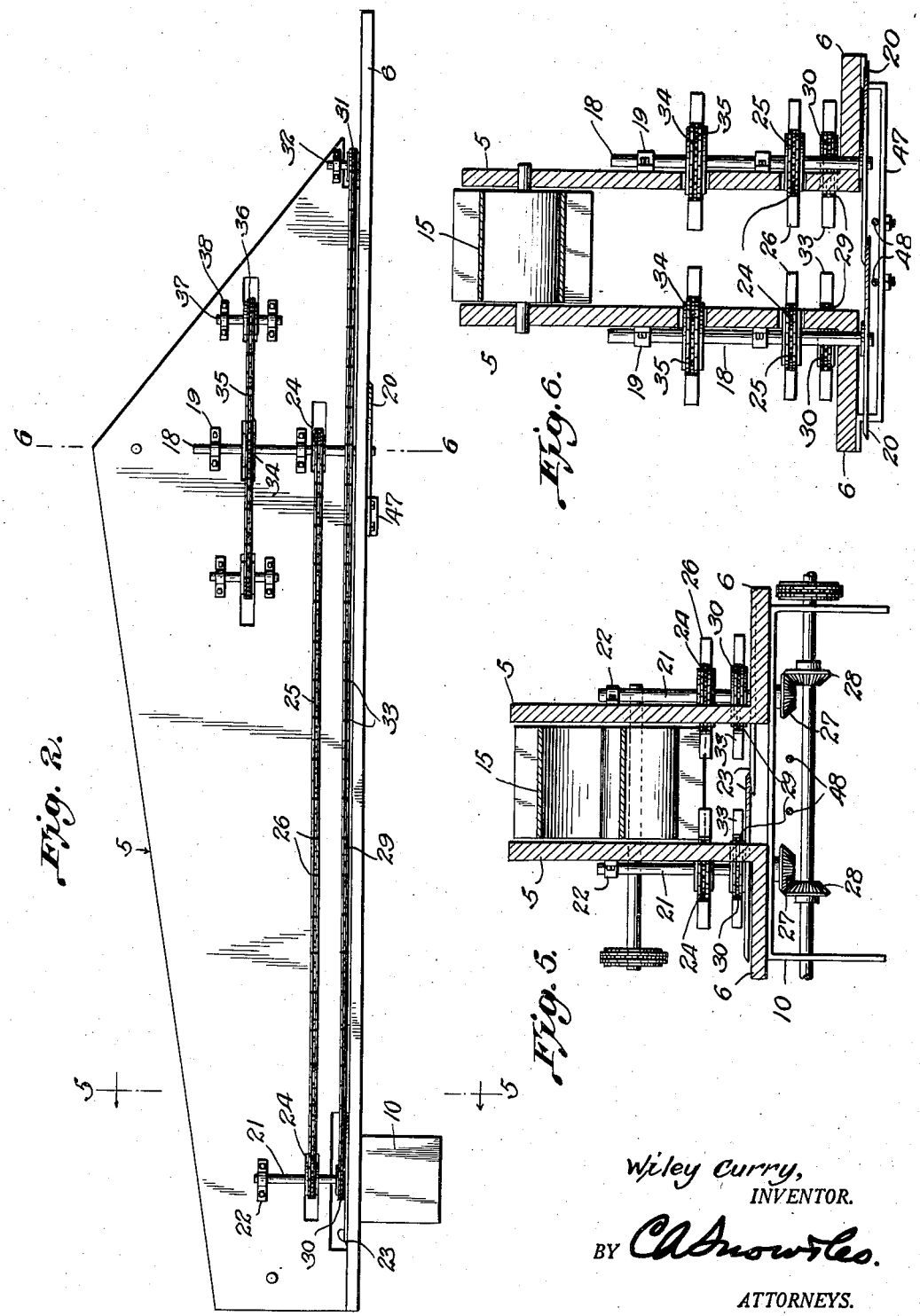

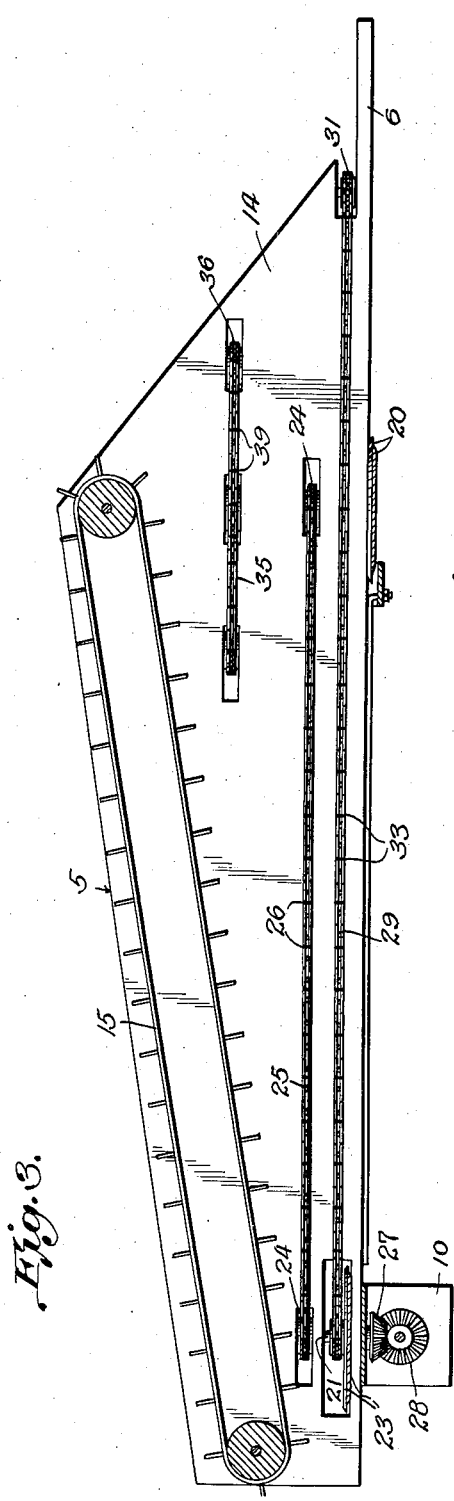
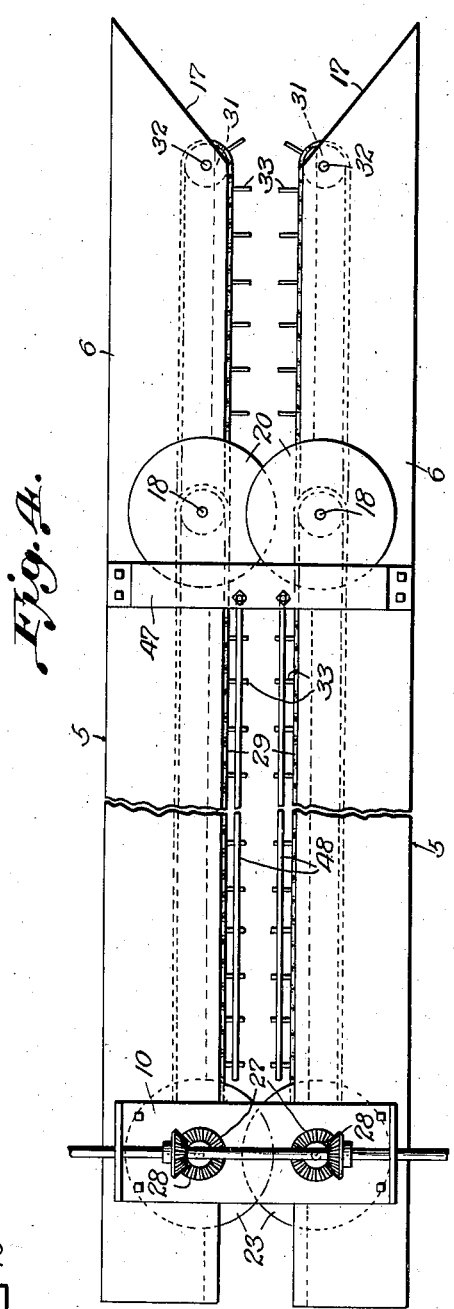

Patented Dec. 13, 1938

2,139,883

UNITED STATES PATENT OFFICE 2,139,883

MAIZE HEADER

Wiley Curry, Tahoka, Tex.

Application September 1, 1937, Serial No. 162,053

4 Claims. (Cl. 56—56)

This invention relates to agricultural machines, and particularly to agricultural machines designed primarily for harvesting grain such as maize, sorghum or the like, which is planted in rows, an important object of the invention being to provide a device of this character which will cut the grain heads from the stalks, and convey the heads to the rear of the machine, to a place of deposit.

Another object of the invention is the provision of means whereby the entire heads of the grain will be cut, regardless of the lengths of the heads.

A still further object of the invention is to provide means for catching the heads of grain after they have been cut, to insure against the grain heads falling through the machine to the ground surface.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a side elevational view thereof.

Figure 3 is a longitudinal sectional view through one of the harvesting sections of the machine.

Figure 4 is a bottom plan view of one of the harvesting sections.

Figure 5 is a sectional view taken on line 5—5 of Figure 2 of the drawings.

Figure 6 is a sectional view taken on line 6—6 of Figure 2.

Figure 1:
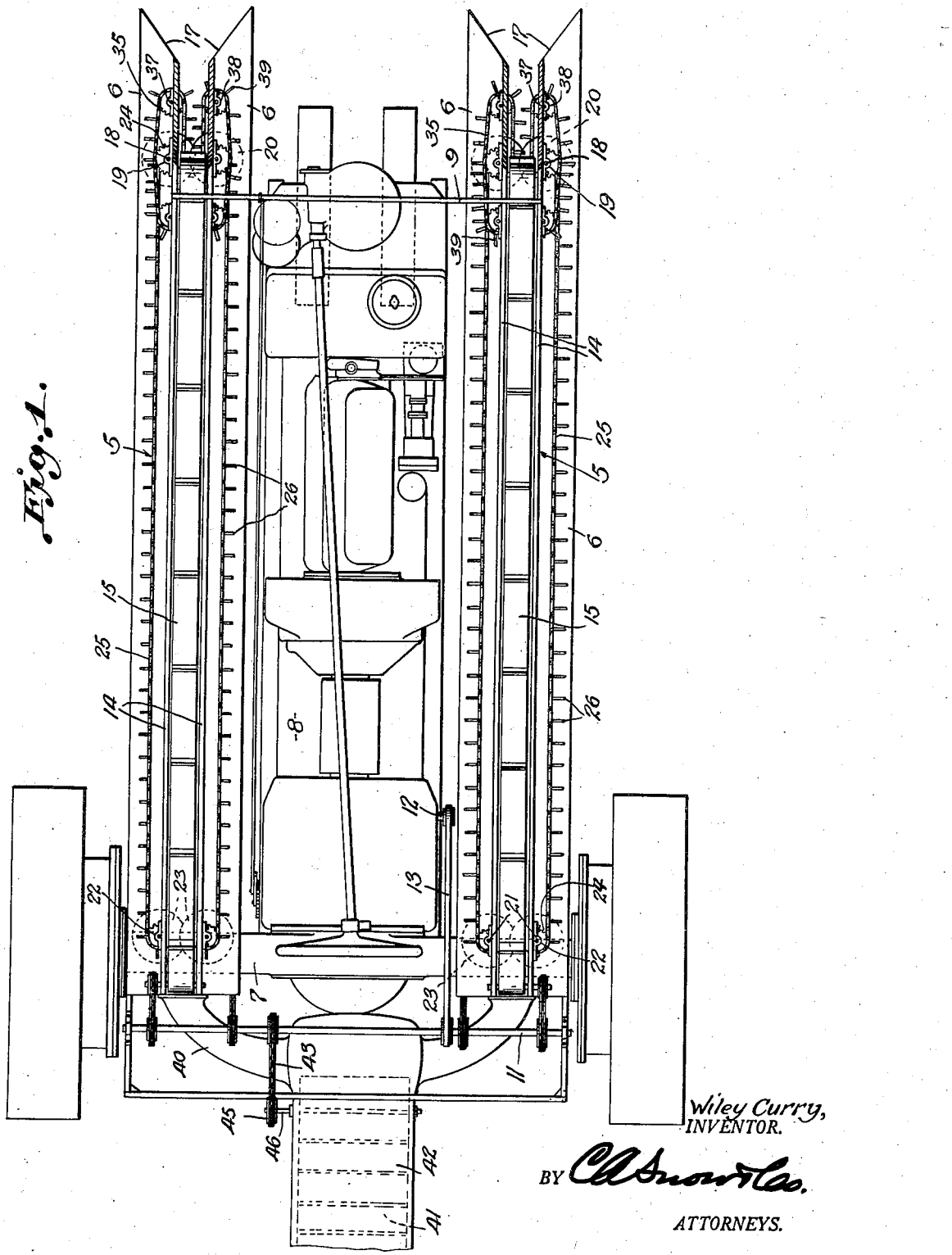
Figure 1 is a plan view of a harvesting machine constructed in accordance with the invention.

Referring to the drawings in detail, the machine embodies a pair of harvesting sections, indicated generally by the reference character 5, the sections being mounted on the usual tractor, and spaced apart in such a manner that two rows of grain may be harvested simultaneously.

In view of the fact that the harvesting sections are identical in construction, only one harvesting section will be described in detail.

Each harvesting section comprises substantially long members 6 spaced apart, as clearly shown by the drawings. These members 6 have their rear ends supported on the main axle 7 of the tractor, which is indicated by the reference character 8, the forward ends of the members 6 being supported by means of the rod 9, that is secured to the forward end of the tractor.

The bracket 10 which connects the members 6 at the rear ends thereof, also provides a support for the power shaft 11 that receives rotary motion from the shaft 12 of the tractor, through the medium of the belt 13.

Extending upwardly from the members 6, and arranged along the inner longitudinal edges thereof, are substantially wide members 14, between which the endless conveyor 15 operates, the endless conveyor being of a width to extend across the space between the members 14. The members 14 are constructed to provide wide forward ends and narrow rear ends, with the result that the endless carrier 15, which operates in parallel relation with the upper edges of the members 14, moves in an inclined plane, the forward end of the carrier 15 being an appreciable distance above the rear end thereof, with the result that the grain engaged by the lugs 16 of the carrier 15, will be gradually bent rearwardly, as the grain heads are carried into the machine to the cutters, to be hereinafter more fully described. In order that the grain will be directed inwardly to the center of the machine, the forward inner ends of the members 6 are beveled as at 17. Vertical shafts 18 are mounted in bearings 19 secured to the outer surfaces of the members 14 near the forward end of the machine, which shafts support the disk-like blades 20 that are of diameters to overlap each other to the end that grain stalks fed into the machine will be cut as the blades rotate. At the rear end of the machine are vertical shafts 21 that operate in bearings 22, the shafts 21 providing supports for the disk-like blades 23 that operate in a plane above the blades 20. Sprockets 24 are secured to the shafts 18 and 21, over which the endless chains 25 operate, there being provided openings in the members 14 through which the chains 25 operate so that the lugs 26 extending therefrom will contact the grain to draw the grain into the machine. These chains also operate to transmit rotary movement of the shafts 21, which carry pinions 27 at their lower ends meshing with pinions 28 secured to the power shaft 11, to the shafts 18. Operating in parallel relation with the chains 25 directly below the chains 25, are chains 29 that move over sprockets 30 mounted on the shafts 21, at the rear of the machine, and over the shafts 32 supported at the forward end of the machine. Lugs 33 extend inwardly from the chains to contact with the grain to move the grain into the machine.

Sprockets 34 are mounted near the upper ends of the shafts 18 and operate the substantially short chains 35 that move over sprockets 36 mounted on shafts 37, that in turn operate in the bearings 38, secured to the members 14. These chains 35 are also provided with horizontal lugs 39 that engage the longer stalks of grain to carry them into the machine.

Disposed at the rear end of each section of the machine, is a pipe 40, through which the heads of grain cut, are fed to the endless conveyor 40 operating in the tubular housing 42, where the heads of grain are carried to a place of deposit. The endless conveyor 41 is operated by the chain 43 moving over the sprocket 44 mounted on the shaft 11, and sprocket 45 mounted on the endless conveyor shaft 46.

Near the central portion of each section is a connecting bar 47, which holds the members 6 in proper spaced relation with each other, and at the same time provide a support for the forward ends of the spaced rods 48 that extend along the bottom of each section at points within the space between the members 6, supporting the heads of grain which would otherwise fall to the ground surface.

I claim:

1. In a grain harvester, a body portion including spaced members, superimposed endless conveyors operating in horizontal spaced relation with respect to each other, a substantially short endless conveyor disposed adjacent to the forward end of the spaced members, and operating above the first mentioned conveyors, and an inclined endless conveyor of a width equal to the width of the space between the spaced members and adapted to engage the heads of the grain being cut and gradually bend the grain downwardly, and knives for cutting the heads from the stalks of the grain.

2. In a grain harvester, a body portion comprising parallel spaced members, upper and lower endless conveyors operating between the spaced members adjacent to the lower edges of the spaced members, front and rear knives mounted on said spaced members, an endless conveyor operating in a plane inclined downwardly from the forward end of the spaced members and above the first mentioned endless conveyors, the latter endless conveyor adapted to feed the grain to the knives.

3. In a grain harvester, a body portion including parallel spaced members, spaced endless conveyors operating adjacent to the lower edges of the spaced members and adapted to feed grain between said members, blades operating adjacent to the forward ends of said spaced members and adapted to cut the standing grain near the bases of the stalks thereof, blades operating adjacent to the rear ends of said spaced members, said conveyors adapted to feed grain into the latter blades to be cut from the stalks, and means for conveying the heads of the grain from the latter knives.

4. In a grain harvester, a pair of longitudinally spaced members, endless conveyors supported by the spaced members, lugs extending inwardly from the spaced members and adapted to engage the stalks of the grain moving the stalks rearwardly, knives adapted to cut the grain stalks at the bases thereof, knives operating adjacent to the rear ends of the spaced members, and a conveyor operating in an inclined plane above the knives for bending the grain stalks rearwardly and feeding the heads of the grain to the latter knives.

WILEY CURRY.